United States Patent
Astovasadourian et al.

(10) Patent No.: US 10,216,171 B2
(45) Date of Patent: Feb. 26, 2019

(54) 3-D PRINTING PROTECTED BY DIGITAL RIGHTS MANAGEMENT

(71) Applicant: Accenture Global Services Limited, Dublin (IE)

(72) Inventors: Alex Astovasadourian, Clamart (FR); Olivier Naro, Clamart (FR); Vincent Cabanel, Boulogne Billancourt (FR)

(73) Assignee: Accenture Global Services Limited, Dublin (IE)

( * ) Notice: Subject to any disclaimer, the term of this patent is extended or adjusted under 35 U.S.C. 154(b) by 242 days.

(21) Appl. No.: 14/950,431

(22) Filed: Nov. 24, 2015

(65) Prior Publication Data

US 2017/0106599 A1 Apr. 20, 2017

(30) Foreign Application Priority Data

Oct. 16, 2015 (EP) .................................... 15290265

(51) Int. Cl.
*G06F 21/10* (2013.01)
*G05B 19/4099* (2006.01)
(Continued)

(52) U.S. Cl.
CPC ........ *G05B 19/4099* (2013.01); *B29C 64/386* (2017.08); *G06F 21/10* (2013.01);
(Continued)

(58) Field of Classification Search
None
See application file for complete search history.

(56) References Cited

U.S. PATENT DOCUMENTS 8,983,957 B2  3/2015 Rathod
9,292,842 B2 * 3/2016 Pereira .................. G06F 21/105
(Continued)

FOREIGN PATENT DOCUMENTS

WO   WO 2013/149296   10/2013
WO   WO 2014/193311   12/2014
WO   WO 2015/116341    8/2015

OTHER PUBLICATIONS

Australian Office Action for Application No. 2016231592, dated Apr. 7, 2017, 4 pages.
(Continued)

*Primary Examiner* — Michael Lebentritt
(74) *Attorney, Agent, or Firm* — Fish & Richardson P.C.

(57) ABSTRACT

Methods, systems, and apparatus, including computer programs encoded on a computer storage medium, for managing 3-D printing. The methods, systems, and apparatus include actions of receiving a request for objects that are stored by the server, providing information describing the objects, receiving a request for digital rights for printing the objects, and providing a description of the digital rights for printing the objects. Additional actions include receiving a request to print the particular object by a particular printer, determining whether digital rights for printing the particular object permit the request to print the particular object by the particular printer to be fulfilled, generating printer instructions for printing the object, and providing the printer instructions to a printer controller that controls the particular printer.

15 Claims, 6 Drawing Sheets

(51) Int. Cl.
*B29C 64/386* (2017.01)
*B33Y 50/02* (2015.01)

(52) U.S. Cl.
CPC ..... *B33Y 50/02* (2014.12); *G05B 2219/35134* (2013.01); *G05B 2219/49007* (2013.01)

(56) References Cited

U.S. PATENT DOCUMENTS

| | | | |
|---|---|---|---|
| 9,754,299 B2* | 9/2017 | Cheng | G06Q 30/06 |
| 9,818,147 B2* | 11/2017 | Tapley | G06Q 30/0635 |
| 2002/0184218 A1 | 12/2002 | Bailey | |
| 2003/0182475 A1* | 9/2003 | Gimenez | G06F 21/10 |
| | | | 710/8 |
| 2004/0039704 A1* | 2/2004 | Gilliam | H04L 63/0428 |
| | | | 705/50 |
| 2004/0059929 A1* | 3/2004 | Rodgers | G06F 21/10 |
| | | | 713/193 |
| 2005/0004873 A1 | 1/2005 | Pou et al. | |
| 2006/0265464 A1* | 11/2006 | Nassiri | H04L 51/30 |
| | | | 709/206 |
| 2007/0162400 A1* | 7/2007 | Brew | G06F 21/10 |
| | | | 705/59 |
| 2007/0230750 A1* | 10/2007 | Ikeda | G06F 17/242 |
| | | | 382/123 |
| 2008/0266593 A1* | 10/2008 | Abad Peiro | G06Q 30/06 |
| | | | 358/1.15 |
| 2009/0165147 A1 | 6/2009 | Jung et al. | |
| 2010/0010910 A1* | 1/2010 | Pampagnin | G06Q 30/0601 |
| | | | 705/26.1 |
| 2010/0171986 A1* | 7/2010 | Amorosa | G06F 21/6209 |
| | | | 358/1.16 |
| 2010/0177358 A1* | 7/2010 | Manchala | G06F 21/608 |
| | | | 358/3.28 |
| 2012/0092724 A1 | 4/2012 | Pettis | |
| 2013/0235412 A1* | 9/2013 | Baldwin | G06F 3/1238 |
| | | | 358/1.14 |
| 2014/0067609 A1* | 3/2014 | Heger | G06Q 30/0623 |
| | | | 705/26.61 |
| 2014/0214684 A1 | 7/2014 | Pell | |
| 2015/0058175 A1 | 2/2015 | Axt et al. | |
| 2015/0142152 A1* | 5/2015 | Rezayat | B29C 67/0088 |
| | | | 700/98 |
| 2015/0170242 A1* | 6/2015 | Bjorndahl | G06Q 30/0621 |
| | | | 705/26.5 |
| 2015/0220291 A1* | 8/2015 | Tapley | G06F 3/1211 |
| | | | 358/1.15 |
| 2015/0220748 A1* | 8/2015 | Leach | G06F 21/608 |
| | | | 726/26 |
| 2015/0221053 A1* | 8/2015 | Tapley | G06Q 50/184 |
| | | | 705/310 |
| 2015/0254435 A1* | 9/2015 | Fells | G06F 21/10 |
| | | | 726/28 |
| 2015/0277834 A1* | 10/2015 | Kawakami | G06F 3/1292 |
| | | | 358/1.15 |
| 2016/0167308 A1* | 6/2016 | Glasgow | B29C 67/0088 |
| | | | 700/98 |
| 2016/0171354 A1* | 6/2016 | Glasgow | B29C 67/0051 |
| | | | 358/1.14 |
| 2016/0180061 A1* | 6/2016 | Pogorelik | G06F 21/10 |
| | | | 713/189 |
| 2016/0297149 A1* | 10/2016 | Albert | B29C 67/0088 |
| 2016/0350827 A1* | 12/2016 | Lee | G06Q 30/0621 |
| 2017/0178212 A1* | 6/2017 | Glasgow | G06Q 30/0621 |
| 2017/0265515 A1* | 9/2017 | Davila | A23P 20/15 |
| 2017/0329937 A1* | 11/2017 | Choi | G06F 21/10 |
| 2018/0089747 A1* | 3/2018 | Tapley | G06Q 30/0635 |

OTHER PUBLICATIONS

Australian Office Action for Application No. 2016231592, dated Jul. 25, 2017, 8 pages.
Australian Office Action for Application No. 2016231592, dated Nov. 4, 2016, 4 pages.
Canadian Office Action for Application No. 2,941,107, dated May 10, 2017, 10 pages.
European Search Report and Written Opinion for Application 15290265.6, dated Apr. 20, 2016, 9 pages.
European Search Report and Written Opinion for Application 15290265.6, dated Oct. 16, 2018, 10 pages.

* cited by examiner

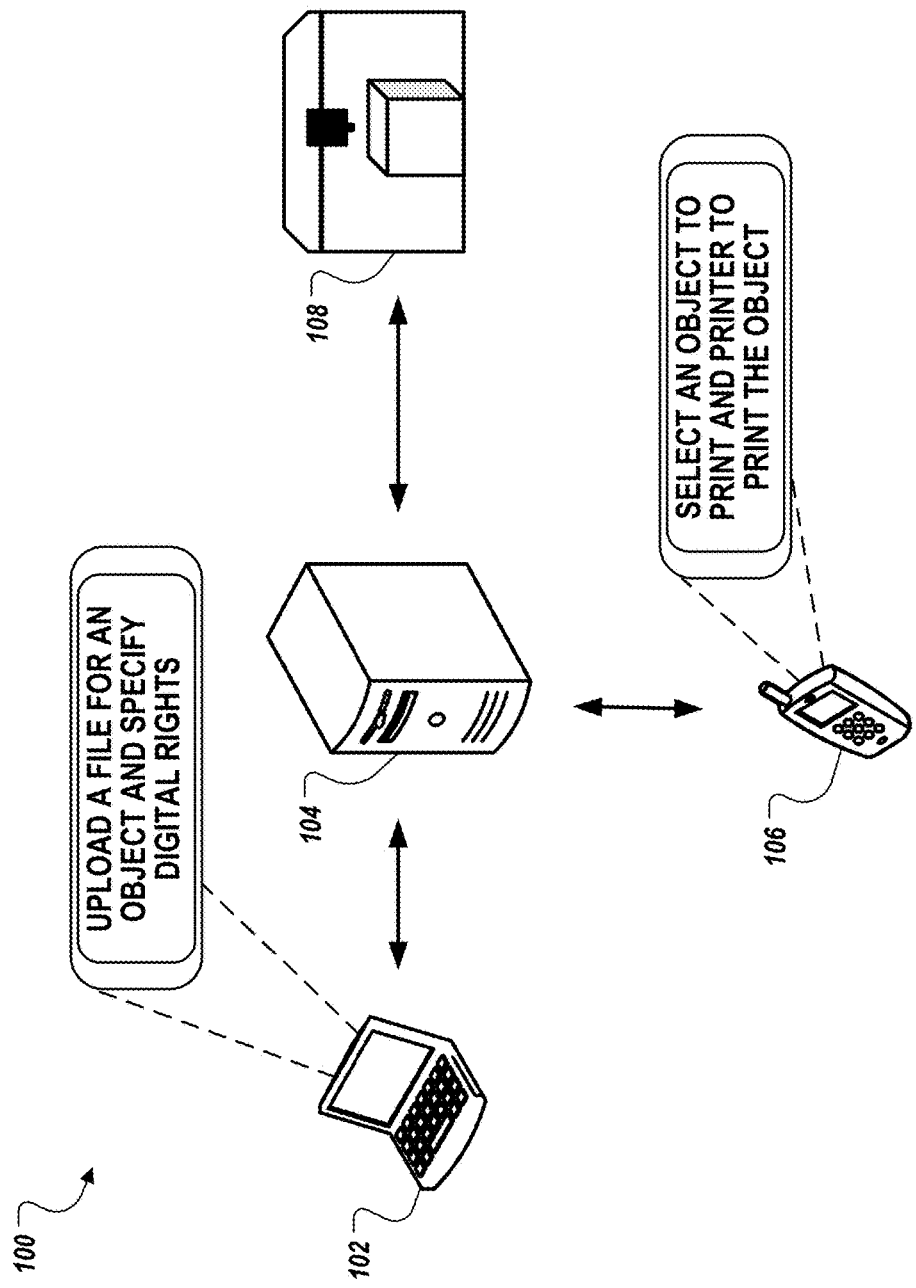

3-D PRINTING PROTECTED BY DIGITAL RIGHTS MANAGEMENT

CROSS-REFERENCE TO RELATED APPLICATION

This application claims priority to European Application No. 15290265.6, filed Oct. 16, 2015, titled "3-D Printing Protected by Digital Rights Management," which is incorporated herein by reference.

TECHNICAL FIELD

This disclosure generally relates to managing 3-D printing.

BACKGROUND

3-D printers may print objects from instructions defining how to print the objects. For example, a 3-D printer may print a screw using a G-Code file that stores instructions for the 3-D printer to print the screw. A G-Code file for one type of 3-D printer may be incompatible with another type of 3-D printer. Additionally, a user may be able to use the 3-D printer and the corresponding G-Code file for an object to print the object as many times and whenever the user desires.

SUMMARY

In general, an aspect of the subject matter described in this specification may involve a process for managing 3-D printing. The process may include enabling devices of designers to provide, to a server, data defining a shape of an object and specify, to the server, digital rights for printing the object or viewing information about the object. The server may store a catalog of objects received from devices of designers. The server may provide the list of objects and corresponding digital rights to devices of consumers. The devices of consumers may determine which objects a consumer can view and display those objects to the consumer, and further determine which objects a consumer can request to print and provide indications to the consumer of which objects the consumer can request to print. The server may receive a request for an object be printed by a particular 3-D printer and determine whether the object may be printed for the consumer based on the digital rights associated with the object and information regarding the consumer. If the server determines that the object cannot be printed, the server may provide an error message to the device of the consumer indicating that the request to print the object cannot be fulfilled. If the server determines that the object can be printed, the server may generate printer instructions for the particular printer to print the object and provide the instructions to the printer. The printer may then print the object using the instructions. Accordingly, the system may manage printing of 3-D objects.

The techniques described herein may provide the following advantages. By allowing designers to specify digital rights and enforcing digital rights, the system may enable designers to control printing of the objects designed by the designer. For example, an advantage may be that designers can control when and who may print the objects, and how many times the objects may be printed. By storing data defining objects and providing listings to consumers, the system may enable consumers to select an object to print from an array of objects defined by data stored by a server and select a 3-D printer to print the object from an array of 3-D printers of various types that are remote from the server. For example, an advantage may be that a consumer may select a screw to print from multiple different screws and select a particular printer closest to the consumer from ten printers each at a different location to print the screw.

In some aspects, the subject matter described in this specification may be embodied in methods that may include the actions of receiving, by a server and from a consumer device, a request for objects that are stored by the server, the objects including a particular object, providing, by the server and to the consumer device, information describing the objects that are stored by the server, and receiving, by the server and from the consumer device, a request for digital rights for printing the objects that are stored by the server. Additional actions include providing, by the server and to the consumer device, a description of the digital rights for printing the objects that are stored by the server, receiving, by the server and from the consumer device, a request to print the particular object by a particular printer, and determining, by the server, whether the digital rights for printing the particular object permit the request to print the particular object by the particular printer to be fulfilled. Further actions include in response to determining that the digital rights for printing the particular object permit the request to print the particular object by the particular printer to be fulfilled, generating, from data defining a shape of the particular object, printer instructions for printing the object and providing the printer instructions to a printer controller that controls the particular printer.

Other versions include corresponding systems, apparatus, and computer programs, configured to perform the actions of the methods, encoded on computer storage devices.

These and other versions may each optionally include one or more of the following features. For instance, in some implementations additional actions include receiving, by the server and from the designer device, the data defining the shape of the particular object and receiving, by the server and from the designer device, the digital rights for printing the particular object. In certain aspects, receiving, by the server and from the designer device, the data defining the shape of the particular object includes receiving a STereo-Lithography (STL) file that defines the shape of the particular object. In some aspects, receiving, by the server and from the designer device, the digital rights for printing the particular object includes receiving digital rights defining that printing the particular object requires a threshold security level, where determining, by the server, whether the digital rights for the particular object permit the request to print the particular object by the particular printer to be fulfilled includes determining, by the server, that a security level of a user of the consumer device satisfies the threshold security level.

In some implementations, receiving, by the server and from the designer device, the digital rights for printing the particular object includes receiving digital rights defining that the particular object can be printed by a user a particular number of times, where determining, by the server, whether the digital rights for the particular object permit the request to print the particular object by the particular printer to be fulfilled includes determining, by the server, that a user of the consumer device has printed the particular object less than the particular number of times. In certain aspects, generating, from data defining a shape of the particular object, printer instructions for printing the object includes generating a G-Code file from the data defining the shape of the particular object. In some aspects, actions include receiving, by the server and from the designer device, digital rights for viewing the particular object and providing, by the server and to the consumer device, the digital rights for viewing the particular object.

In some implementations, actions include determining, by the server, 3-D printers that are in communication with the server and providing, by the server to the consumer device, an indication of 3-D printers that are in communication with the server. In certain aspects, the particular printer is in a geographic location that is remote from the server.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

FIG. 1A is a block diagram of a system for managing 3-D printing.

Like reference symbols in the various drawings indicate like elements.

DETAILED DESCRIPTION

Figure 1B:
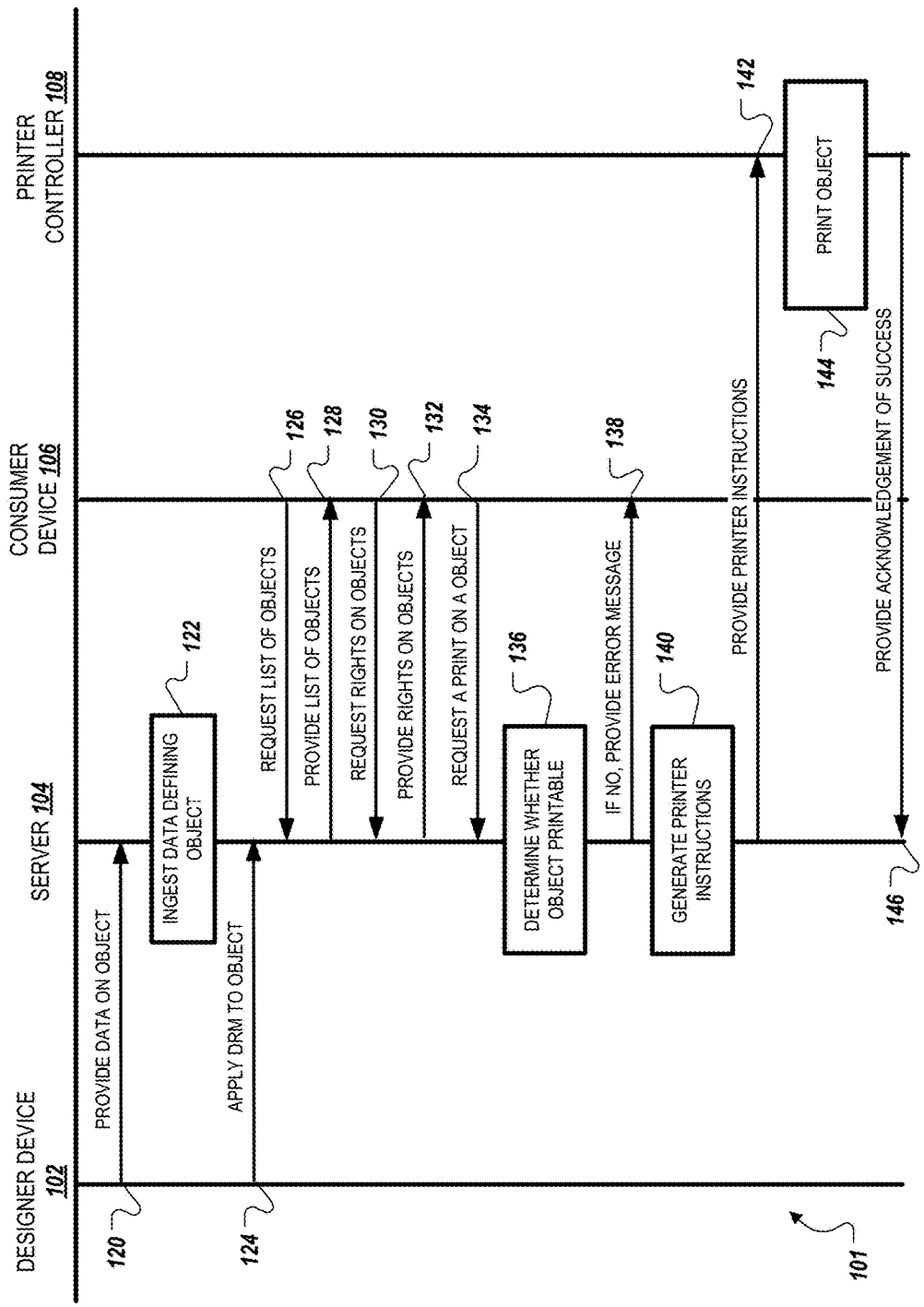
FIG. 1B is an interaction diagram of an example interaction for managing 3-D printing.

FIG. 1A is a block diagram of a system 100 for managing 3-D printing. The system 100 may include a designer device 102, a server 104, a consumer device 106, and a printer controller 108. The designer device 102, the server 104, the consumer device 106, and the 3-D printer controller 108 may be in communication with one or more of each other over a network, e.g., a local network or a wide area network. The communications may be in the form of application programming interface (API) calls or JavaScript Object Notation (JSON).

The designer device 102 may be a laptop, desktop computer, tablet computer, or some other computing device that may be used by a designer to design an object and save data on the designed object. For example, a designer may use a 3-D stereolithography computer-aided design (CAD) software to model a screw and store the model as a file in the STereoLithography (STL) format. The designer device 102 may display a graphical user interface through which the designer may upload data specifying a shape of an object and specify digital rights for the object. For example, the designer device 102 may display a graphical user interface through which the designer may select to upload to the server 104 a STL file for a screw and designate that any user may print the screw up to five times.

The server 104 may be one or more computers that manage the data defining the shapes of objects. For example, as described in more detail below in regards to FIG. 1B, the server 104 may receive data defining shapes of objects, receive digital rights for the objects, store the objects and digital rights, provide information describing the objects and digital rights, receive requests to print objects, determine whether the requests to print the objects may be fulfilled, and cause the requests to be fulfilled.

The consumer device 106 may be a laptop computer, a desktop computer, a tablet computer, a smartphone or some other computing device used by a consumer to request that one or more objects be printed. For example, a consumer may receive from the server 104 a list of objects that may be printed and printers available for printing, and display a graphical user interface through which the user may select an object to print and a printer to print the object.

The printer controller 108 may be a server that provides network connectivity for a 3-D printer. For example, the printer controller 108 may receive a G-Code file from the server 104 and provide instructions specified in the G-Code file to the 3-D printer. In some implementations, the printer controller 108 may be included in a 3-D printer. A 3-D printer may be a device that is capable of generating physical 3-D objects under computer control. The 3-D printer may "print" successive layers of material to produce a 3-D object.

Different configurations of the system 100 may be used where functionality of the designer device 102, the server 104, the consumer device 106, and the printer controller 108 may be combined, further separated, distributed, or interchanged. For example, the server 104 may also enable designers to design objects or multiple consumer devices 106 may be used in the system 100.

FIG. 1B is an interaction diagram 101 of an example interaction for managing 3-D printing. The following describes the interaction as being performed by components of the system 100. However, the interaction may be performed by other systems or system configurations. For example, a system may include one or more designer devices, one or more consumer devices, and one or more 3-D printers.

After data on an object is generated on the designer device 102, the designer device 102 may receive a request from the designer to provide the data on the object to the server 104 (120). For example, the designer device 102 may provide a graphical user interface where the designer may select a STL file for the model of the screw, enter a title for the screw, and enter a description for the screw, and select a button to upload the model for the screw to the server 104. In some implementations, the graphical user interface may be in a resource, e.g., a web page or form, provided from the server 104 to the designer device 102 and rendered on the designer device 102.

The server 104 may ingest the data defining the object (122). For example, the server 104 may receive a model of the screw, entered title, and entered description from the designer device 102, and add the screw to a catalog that the server stores that lists all objects available from the server. After ingesting the data, the server 104 may indicate to the designer device 102 that the data is successfully ingested.

The designer device 102 may apply digital rights management to an object (124). For example, the designer device 102 may provide a graphical user interface where a designer may specify what digital rights that the designer wishes to apply to the model of the screw that was just provided to the server 104, and the designer device 102 may then provide the specified digital rights to the server 104. In some implementations, the graphical user interface may be in a resource, e.g., a web page or form, provided from the server 104 and rendered on the designer device 102. The digital rights may include a security level. For example, each object may be assigned a security level, e.g., low, medium, or high, and each consumer may also be assigned a security level, where the consumer may only view or print the object if the consumer's security level satisfies the security level of the object. In a particular example of satisfaction, a low security level setting for an object may be satisfied by a low, medium, or high security level of a consumer, a medium security level setting for the object may be satisfied by a medium or high security level of a consumer, and a high security level setting for the object may be satisfied by a high security level of a consumer.

The digital rights may include printing an object a particular number of times per consumer. For example, a designer may specify that each consumer may only print the screw ten times. In another example, a designer may specify that some consumers, e.g., low security level, may print the screw five times but that some consumers, e.g., high security level, may print the screw twenty times. The digital rights may include printing an object for a given duration after a first print. For example, a designer may specify that each consumer may print the screw for a duration of two days after the first time the particular consumer printed the screw. The digital rights may include that the object is downloadable. For example, the designer may specify that the data defining the object, e.g., the STL file for the screw, may be downloadable by consumers. The digital rights may include that the object is printable. For example, the designer may specify that by default the object can't be printed, and consumers may request permission to print the object. The digital rights may include the object is printable by one or more particular consumers. For example, the designer may specify that the object may only be printed by one or more particular consumers. The digital rights may include that the resource is printable until a particular date. For example, on Oct. 1, 2015, the designer may specify that the object may be printed up until Oct. 31, 2015.

The digital rights may be used in combination. For example, digital rights defining that only high security level consumers may print an object and that an object may be printed up until Oct. 31, 2015 may result in an object that may only be printed by high security level consumers up until Oct. 31, 2015. In some implementations, where digital rights specified may conflict, for example, a particular consumer is specified as having print permission but a security level for printing is specified that the particular consumer does not satisfy, the server 104 may identify the conflict and provide a message to the designer indicating the conflict and requesting whether the designer would like the particular consumer be an exception to the security level permissions, select another particular consumer as having print permissions, or select another security level for print permissions, or change a security level of the particular consumer.

After the digital rights management is applied to the object, the consumer device 106 may request a list of objects from the server 104 (126). For example, the consumer device 106 may have a consumer log into an application using an account associated with the consumer, provide a graphical user interface where the consumer may request to view objects from the server 104, and in response to receiving, from the consumer, the request, provide a request for the list of objects to the server 104. In some implementations, the request may include information identifying the consumer. For example, the request may include an identity of the consumer or a security level of the consumer.

The server 104 may receive the request for the list of objects and provide the consumer device 106 a list of objects available to be viewed 122. For example, the server 104 may store one hundred objects and provide the consumer device 106 a list of all one hundred objects including titles and descriptions. In another example, the server 104 may receive the request, determine an identify of the consumer or a security level of the consumer, determine the objects that the consumer may view based on identity of the consumer or the security level of the consumer, and then provide the consumer device 106 a list of objects with only the objects that the consumer may view.

The consumer device 106 may receive the list of objects from the server 128 and provide a request for rights on the objects (130). For example, the consumer device 106 may receive a list of all one hundred objects available for printing, or a list of only the objects that a consumer may view, and request digital rights for all the objects in the list.

The server 104 may provide rights on objects to the consumer device 106 (132). For example, the server 104 may provide digital rights for all the objects for which the consumer device 106 requests digital rights. In some implementations, the server 104 may provide the digital rights for each of the objects when the server 104 provides the list of objects and the consumer device 106 does not request digital rights after receiving the list of objects as the consumer device 106 already receives the digital rights with the list of objects.

The consumer device 106 may request a print on an object (134). For example, after receiving the rights on the objects the consumer device 106 may determine which objects the consumer may view and print based on the digital rights, provide a graphical user interface to the consumer that enables the consumer to view only the objects that the consumer may view according to the digital rights and that enables the consumer to request to print objects that the consumer can print according to the digital rights, receive a selection from the consumer to print the screw on the printer controller 108, and provide the request to print the object to the server 104. In some implementations, if the consumer device 106 determines that a consumer may not print an object based on the digital rights, the consumer device 106 may display an indication that the object is not printable for the consumer and provide the consumer an option to request permission to print the object instead of an option for the consumer to request a print of the object.

The server 104 may receive the request to print on the object and in response determine whether the object is printable (136). For example, the server 104 may verify that the object may be printed for the consumer based on the digital rights and identity of the consumer.

If the server 104 determines that the object cannot be printed for the consumer, the server 104 may provide an error message to the consumer device 106 indicating that the object cannot be printed (138). In some implementations, the error message may indicate which digital rights are not satisfied for the request. For example, the error message may indicate that the digital rights specify that a screw may only be printed five times per consumer and that the consumer has printed the screw five times already, and include an option for the consumer to request permission to print the screw more times. In another example, the error message may indicate that the digital rights specify that the screw may only be printed by a consumer with a medium or higher security level, that the consumer only has a security level of low, and include an option for the consumer to request special permission to print the screw.

If the server 104 determines that the object can be printed for the consumer, the server 104 may generate printer instructions (140). For example, the server 104 may determine the type of the printer that is selected to print the object, identify a slicer for generating printer instructions for the particular type of printer, e.g., G-Code, from data defining the shape of the object, e.g., a STL file, generate G-Code using the slicer from the STL file for a screw, and provide the G-Code to the printer controller 108. In another example, the server 104 may provide the data defining the shape of the object, e.g., a STL file, to the printer controller 108 for the printer controller 108 to print the object using the data defining the shape of the object.

The printer controller 108 may print the object (144). For example, the printer controller 108 may receive G-Code for printing a screw and print the screw based on the G-Code. In some implementations, the printer controller 108 may also provide instructions to a print personnel for the print personnel to handle the printing of the screw by the printer controller 108. In a particular example, the instructions to the print personnel may be to place the printer controller 108 in a particular orientation or insert a particular type of plastic for printing.

The printer controller 108 may provide an acknowledgement of success to the server 104 (146). For example, the printer controller 108 may determine when an object is successfully printed and in response to a success, provide the acknowledgement of success to the server 104. In some implementations, the server 104 may increment a print count for a consumer based on receiving an acknowledgement of success from the printer controller 108. For example, if an acknowledgment of success is received from the printer controller 108 for a print of three times of an object, the server 104 may indicate that the object has been printed three more times for a particular consumer.

In some implementations, the server 104 may identify the 3-D printers available for printing, determine which 3-D printers may print which objects, and provide the consumer device 106 indications of which 3-D printers may print an object. For example, the server 104 may detect when 3-D printers are added or removed and determine for each object which 3-D printers may print the object, and when receiving a request from the consumer device 108 for a list of objects, provide information for each object as to which 3-D printers are capable of printing the object. The consumer device 106 may then use the information to provide the consumer the option to select one or more of the 3-D printers that are capable of printing the object.

Figure 2A:
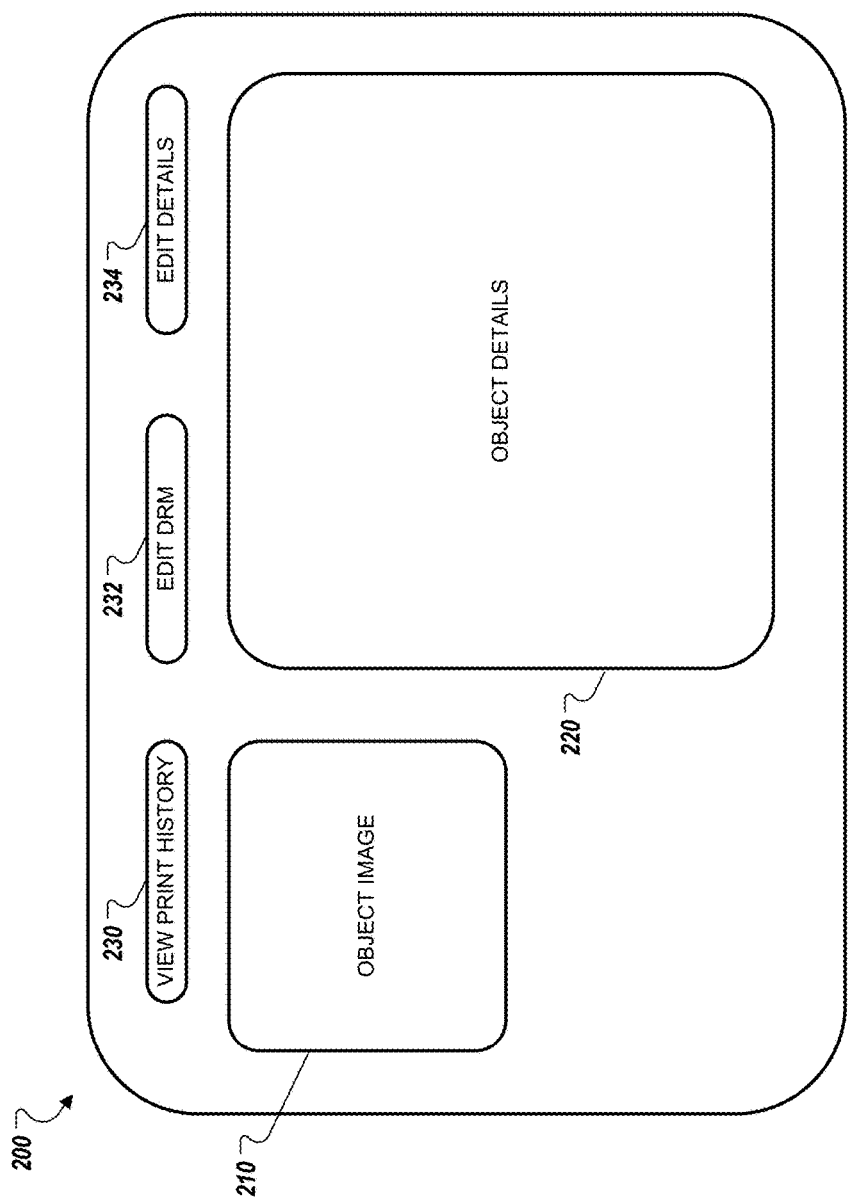
FIGS. 2A and 2B are interfaces for managing 3-D printing.

FIG. 2A is an example interface 200 for managing 3-D printing. The interface 200 may include an object image area 210, an object details area 220, a view print history control 230, an edit DRM control 232, and an edit details control 234. The interface 200 may be displayed on a designer device 102 or a device of an administrator that may modify digital rights or details of objects. The interface 200 may be displayed in response to a selection of a particular object. For example, the interface 200 may be displayed when a screw is selected from a list of all objects stored by the server 104 or a list of objects that are responsive to a search for objects that satisfy a particular criteria, e.g., a search for objects titled "Screw."

The object image area 210 may be an area of the interface 200 that includes an image of the object. For example, when a screw is selected, the object image area 210 may display an image of the screw. The object details area 220 may be an area that displays details of an object. For example, when a screw is selected, the object details area 220 may display a title of the object, a unique identifier for the object, an owner of the object, a type of the object, and digital rights of the object. The digital rights of the object may include a security level to view the object, one or more geographic areas where the object can be printed, number of times the object may be printed, length of time that the object can be printed, whether the object is printable, what users may print the object, whether the data defining the shape of the object may be downloaded, date until the object is printable, and other criteria.

Figure 2B:
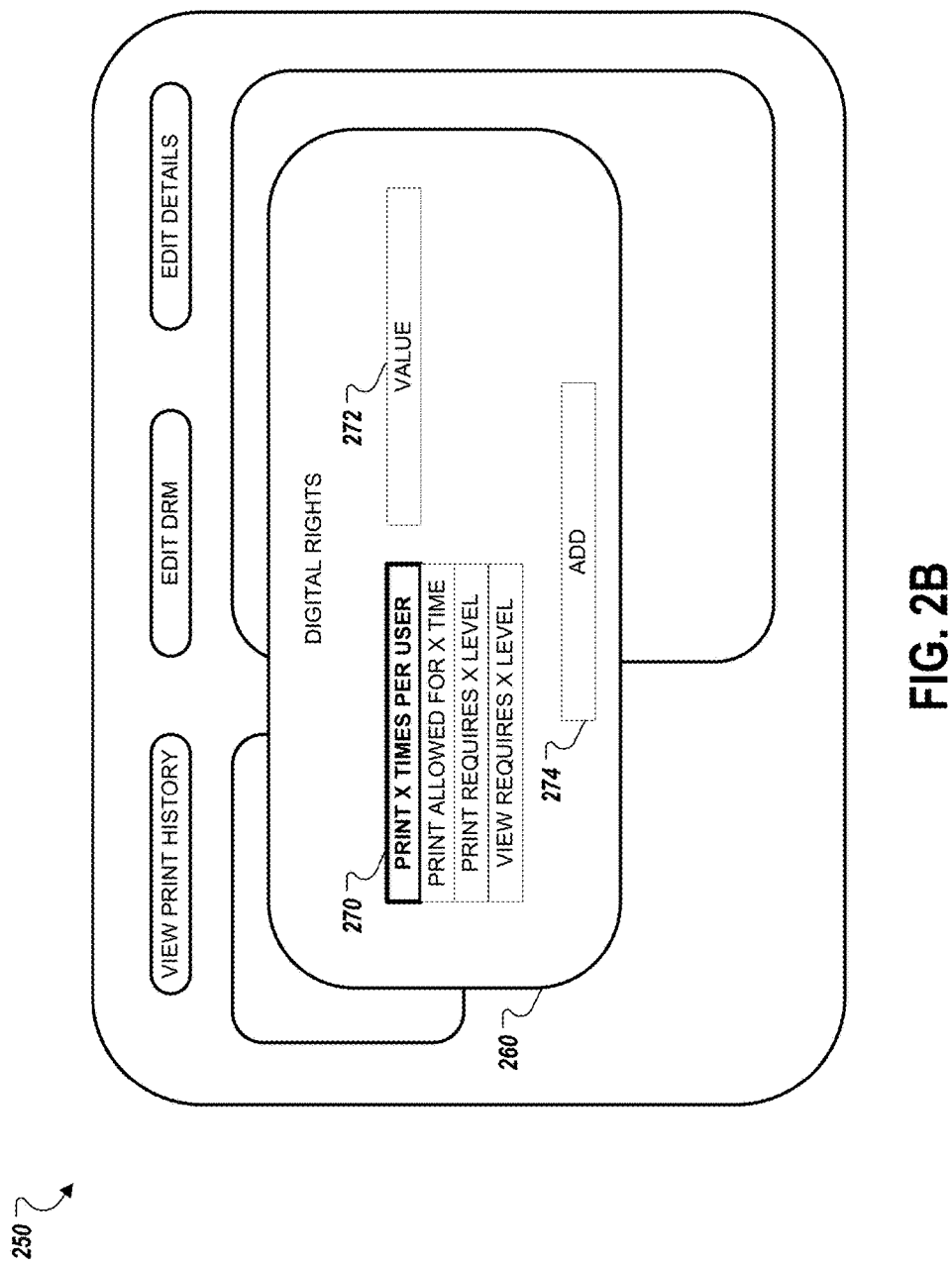

The view print history control 230 may be a control that may be selected to display information regarding a print history for an object. For example, if a designer selects for a screw the view print history control 230 on the designer device 102, a window may open showing dates and times that the screw was printed, and for each time, what user printed the screw and what printer the screw was printed on. The edit DRM control 232 may be a control that may be selected to edit digital rights for an object. For example, if a designer selects for a screw the edit DRM control 232 on the designer device 102, a window may open showing digital rights that may be assigned, as shown in FIG. 2B. The edit details control 234 may be a control that may be selected to edit details for an object. For example, if a designer selected for a screw the edit details control 234 on the designer device 102, a window may open with pre-populated fields with object details for the screw previously provided by the designer and the fields may be edited by the designer.

FIG. 2B is an example interface 250 for managing 3-D printing. The interface 250 may be similar to interface 200 but also show a digital rights window 260 where digital rights may be specified for an object. For example, in response to a selection for the screw of the edit DRM control 232, the interface 250 may show an object image and object details for a screw and show a digital rights window overlaying the object image and object details. The digital rights window 260 may include fields through which digital rights for an object may be specified. For example, the digital rights window 260 may include a drop down menu 270 that includes options of "Print X times per user," "Print allowed for X time," "Print requires X level," "View requires X level," or other options, a field for a value of a parameter to be specified 272, and an add control 274 that may be selected to add digital rights. In a particular example, the server 104 may store that a screw may be printed five times per user based on a designer selecting the option "Print X times per user," entering five in the value field 272, and selecting the add control 274. In some implementations, after the digital rights of print five times per user is added for a screw, the digital rights window 260 may show that the digital right of print five times per user exists for the screw and provide controls for a designer to select to change the number of times or delete the digital right for print five times per user.

Figure 3:
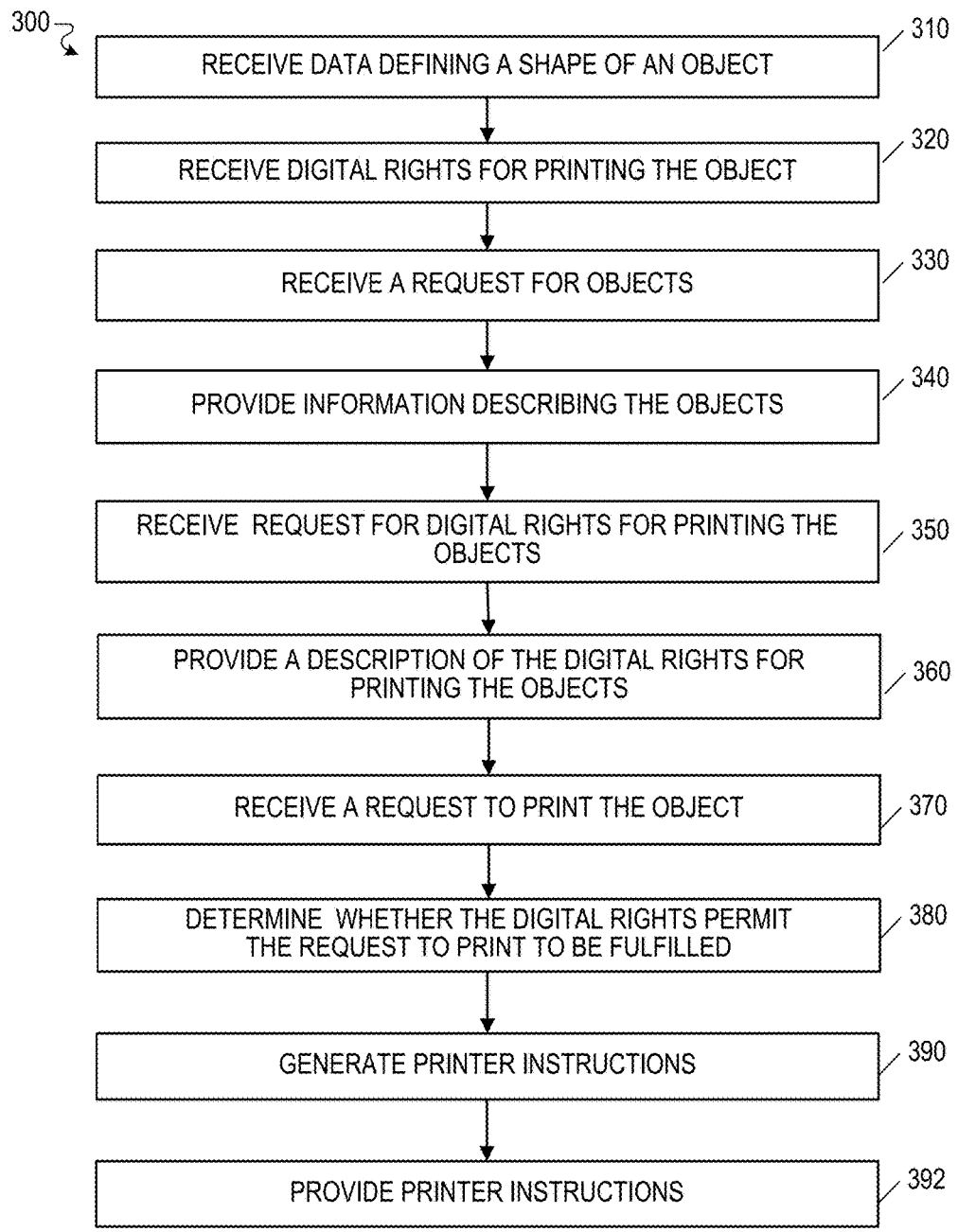
FIG. 3 is a flowchart of an example process for managing 3-D printing.

FIG. 3 is a flowchart 300 of an example process for managing 3-D printing. The following describes the process as being performed by components of the system 100. However, the interaction may be performed by other systems or system configurations.

Data defining a shape of an object may be received (310). For example, the server 104 may receive from the designer device 102 a STL file defining a shape of a nut. Digital rights for printing the object may be received (320). For example, the server 104 may receive from the designer device 102 digital rights specifying that the nut may only be viewed by consumers with a security level of high located in the U.S. and printed by only consumers with a security level of high and in the U.S.

A request for objects may be received (330). For example, the server 104 may receive a request from a consumer device 106 for all objects that are stored by the server 104. In another example, the server 104 may receive a request from a consumer device 106 for all objects that are viewable by a consumer with a particular security level located in a particular geographic area.

Information describing the objects may be provided (340). For example, the server 104 may provide to the consumer device 106 a list of all objects stored by the server 104. In other example, the server 104 may determine objects that may be viewed by a consumer using the consumer device 106 based on one or more of the particular security level or geographic location of the consumer indicated in the request and provide a list only including those objects that the consumer may view to the consumer device 106.

A request for digital rights for printing the objects may be received (350). For example, the server 104 may receive from the consumer device 106 a request for digital rights for all the objects listed as being stored by the server 104.

A description of digital rights for printing the objects may be provided (360). For example, the server 104 may determine the digital rights associated with each of the objects for which digital rights are requested and provide a description of the obtained digital rights to the consumer device 106.

A request to print the object may be received (370). For example, the server 104 may receive a request to print a nut that was listed to the consumer device 106 where the request also specifies a particular 3-D printer print the nut. In some implementations, the server 104 may previously determine 3-D printers in communication with the server 104 and provide an indication of the 3-D printers that may print objects to the consumer device 106, and the consumer device 106 may receive a selection of an object, determine which of the 3-D printers indicated as available have the capability to print the object, indicate to the consumer using the consumer device 106 which 3-D printers indicated as available have the capability to print the object, and receive a selection from the consumer of a 3-D printer to print the object from the 3-D printers indicated as available and having the capability to print the object.

In some implementations, the consumer device 106 may determine whether a 3-D printer has the capability to print a particular object based on comparing requirements specified in data defining a shape of the object and indications of capability of printers. For example, data defining a shape of a nut may indicate that the nut must be printed using a particular type of plastic, the consumer device 106 may receive information from the server 104 indicating the types of plastic that available printers may print, and determine which of the available printers may print using the particular type of plastic required for the nut.

A determination may be made whether the digital rights permit the request to print to be fulfilled (380). For example, the server 104 may determine that the nut has been printed four times by a consumer using the consumer device 106 and that the digital rights for the nut specify that the nut may be printed five times, and in response, determine that the digital rights permit the request to print to be fulfilled. In another example, the server 104 may determine that the request to print the nut is for a consumer with a low security level and that the digital rights of the nut indicate that only consumers with at least a medium security level may print the nut, and in response, determine that the digital rights do not permit the request to print to be fulfilled.

In response to determining that the digital rights permit the request to print to be fulfilled, printer instructions may be generated (390). For example, in response to determining that a nut may be printed for a consumer, the server 104 may determine a type of the printer that the request specifies to print the nut, identify a slicer for generating a G-Code file for the type of printer from a STL file, and apply the slicer to the STL file for the nut to generate a G-Code file for the type of printer to print the nut.

The printer instructions may be provided (392). For example, the server 104 may provide the G-Code file for the type of printer to print the nut to the printer controller 108 for the 3-D printer of the type, and the printer controller 108 may then provide instructions for printing the nut to the 3-D printer.

In some implementations, the system 100 may include a dashboard. For example, a dashboard may be accessed by an administrator of the system or a print personnel physically operating the 3-D printer to view statuses of print jobs on the 3-D printer. Statuses may include printing, in queue, receiving G-Code file, or other statuses.

In some implementations, the system 100 may use encryption. For example, when a G-Code file is generated, the server 104 may encrypt the G-Code file using an encryption key and provide the encrypted G-Code file to the print controller 108. When a print personnel of the 3-D printer requests to actually print the object, the device of the print personnel may receive the request, determine whether the print personnel can print the object, and in response to determining that the print personnel can print the object, provide the decryption key of the G-Code file. The device of the print personnel may then provide the decryption key for the printer controller 108 to decrypt the G-Code file and print the object using the decrypted G-Code file. Once the object has finished printing, the print personnel may then use the print personnel device to instruct that the printer controller 108 delete the G-Code file and for the print personnel device to indicate to the server 104 that the object was successfully printed. The consumer device 106 may then be notified that the object was successfully printed with a push notification in response to the server 104 receiving the indication that the object was successfully printed or in response to request from the consumer device 106 for a status of the print.

In some implementations, the server 104 may enable an administrator to modify security levels of consumers. For example, the server 104 may provide an interface for the administrator to select a particular consumer and change a security level of the consumer from low to high or from medium to low. In another example, the administrator may manage objects stored by the server 104. For example, the server 104 may provide the administrator an interface through which the administrator may delete objects or modify details or digital rights of objects.

Figure 4:
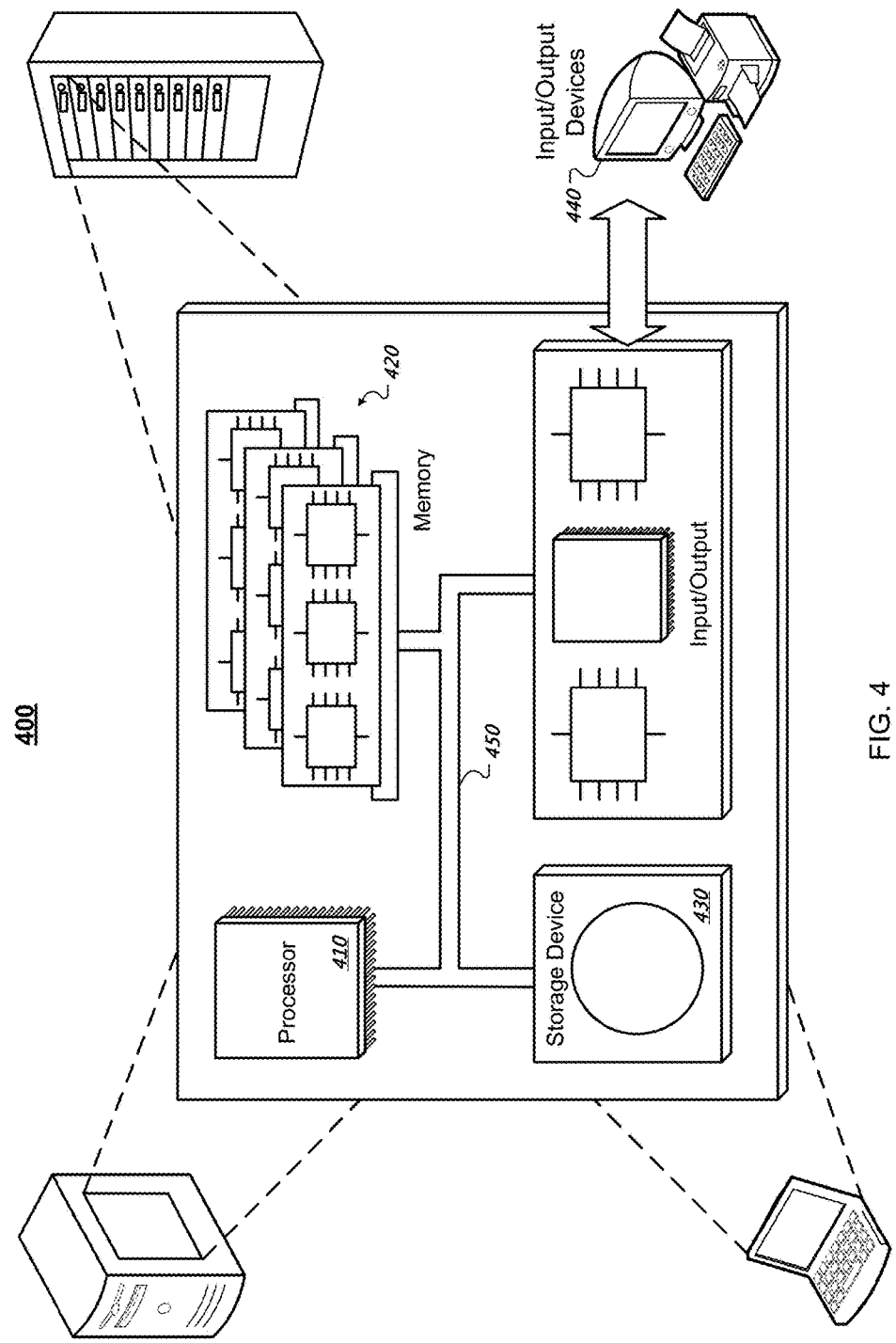
FIG. 4 illustrates a schematic diagram of an exemplary generic computer system.

FIG. 4 illustrates a schematic diagram of an exemplary generic computer system. The system 400 can be used for the operations described in association with the interaction 100 according to some implementations.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 200. In one implementation, the input/output device 440 includes a keyboard and/or pointing device. In another implementation, the input/output device 440 includes a display unit for displaying graphical user interfaces.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

The invention claimed is:

1. A computer-implemented method comprising:
receiving, by a system that includes (i) a server that is configured to instruct a particular printer to print a particular printable object on behalf of a particular consumer in response to a determination by the server that a number of times that the particular printable object was indicated by a set of printers as having been successfully printed on behalf of the particular consumer is less than a number of prints specified by digital rights for printing the particular printable object on behalf of the particular consumer, (ii) a printable object designing device, (iii) a consumer device, (iv) a set of printers, and (v) a set of printer controllers that each control a printer of the set of printers and each include logic that causes the printer controller to provide an indication to the server that the particular printable object was successfully printed on behalf of the particular consumer in response to a determination that the particular printable object has finished being printed by the printer, at the server and from the printable object designing device, data defining the shape of the particular printable object;

receiving, at the server and from the printable object designing device, the digital rights that specify the number of prints for the particular printable object on behalf of the particular consumer;

receiving, at the server from the consumer device, a request for printable objects that are stored by the server;

providing, by the server to the consumer device, information describing the printable objects that are stored by the server and viewable by the consumer using the consumer device;

receiving, at the server from the consumer device, a request for digital rights for printing the printable objects that are stored by the server and viewable by the consumer using the consumer device;

providing, by the server to the consumer device, a description of the digital rights for printing the printable objects that are stored by the server and viewable by the consumer using the consumer device;

receiving, at the server from the consumer device, a request to print a particular printable object of the printable objects by a particular printer of the set of printers;

determining, by the server, whether the number of times that the particular printable object was indicated by the set of printers as having been successfully printed on behalf of the particular consumer is less than the number of prints specified by the digital rights for printing the particular printable object on behalf of the particular consumer;

in response to determining that the number of times that the particular printable object was indicated by the set of printers as having been successfully printed on behalf of the particular consumer is less than the number of prints specified by the digital rights for printing the particular printable object on behalf of the particular consumer; generating, from the data defining the shape of the particular printable object, printer instructions for printing the particular printable object;

providing the printer instructions to the printer controller that controls the particular printer;

receiving, by the server and from the printer controller that controls the particular printer, an indication that the particular printable object that was requested by the consumer device to be printed was successfully printed by the particular printer; and in response to receiving, by the server and from the printer controller that controls the particular printer, the indication that the particular printable object that was requested by the consumer device to be printed was successfully printed by the particular printer, incrementing, by the server, a count of the number of times that the particular printable object was indicated by the set of printers as having been successfully printed on behalf of the particular consumer.

2. The method of claim 1, wherein receiving, at the server and from the printable object designing device, the data defining the shape of the particular object comprises receiving a STereoLithography (STL) file that defines the shape of the particular printable object.

3. The method of claim 1, wherein receiving, at the server and from the printable object designing device, the digital rights comprises receiving digital rights defining that printing the particular printable object requires a threshold security level,
    wherein determining, by the server, whether the digital rights for the particular printable object permit the request to print the particular printable object by the particular printer to be fulfilled comprises determining, by the server, that a security level of the consumer using the consumer device satisfies the threshold security level.

4. The method of claim 1, wherein generating, from the data defining the shape of the particular printable object, printer instructions for printing the particular printable object comprises generating a G-Code file from the data defining the shape of the particular printable object.

5. The method of claim 1, comprising receiving, at the server and from the printable object designing device, digital rights for viewing the particular printable object and providing, by the server to the consumer device, the digital rights for viewing the particular printable object.

6. The method of claim 1, comprising:
    determining, by the server, 3-D printers that are in communication with the server; and
    providing, by the server to the consumer device, an indication of 3-D printers that are in communication with the server.

7. The method of claim 1, wherein the particular printer is in a geographic location that is remote from the server.

8. A system comprising:
    one or more computers and one or more storage devices storing instructions that are operable, when executed by the one or more computers, to cause the one or more computers to perform operations comprising:
    receiving, by a system that includes (i) a server that is configured to instruct a particular printer to print a particular printable object on behalf of a particular consumer in response to a determination by the server that a number of times that the particular printable object was indicated by a set of printers as having been successfully printed on behalf of the particular consumer is less than a number of prints specified by digital rights for printing the particular printable object on behalf of the particular consumer, (ii) a printable object designing device, (iii) a consumer device, (iv) a set of printers, and (v) a set of printer controllers that each control a printer of the set of printers and each include logic that causes the printer controller to provide an indication to the server that the particular printable object was successfully printed on behalf of the particular consumer in response to a determination that the particular printable object has finished being printed by the printer, at the server and from the printable object designing device, data defining the shape of the particular printable object;
    receiving, at the server and from the printable object designing device, the digital rights that specify the number of prints for the particular printable object on behalf of the particular consumer;
    receiving, at the server from the consumer device, a request for printable objects that are stored by the server;
    providing, by the server to the consumer device, information describing the printable objects that are stored by the server and viewable by the consumer using the consumer device;
    receiving, at the server from the consumer device, a request for digital rights for printing the printable objects that are stored by the server and viewable by the consumer using the consumer device;
    providing, by the server to the consumer device, a description of the digital rights for printing the printable objects that are stored by the server and viewable by the consumer using the consumer device;
    receiving, at the server from the consumer device, a request to print a particular printable object of the printable objects by a particular printer of the set of printers;
    determining, by the server, whether the number of times that the particular printable object was indicated by the set of printers as having been successfully printed on behalf of the particular consumer is less than the number of prints specified by the digital rights for printing the particular printable object on behalf of the particular consumer;
    in response to determining that the number of times that the particular printable object was indicated by the set of printers as having been successfully printed on behalf of the particular consumer is less than the number of prints specified by the digital rights for printing the particular printable object on behalf of the particular consumer; generating, from the data defining the shape of the particular printable object, printer instructions for printing the particular printable object;
    providing the printer instructions to the printer controller that controls the particular printer;
    receiving, by the server and from the printer controller that controls the particular printer, an indication that the particular printable object that was requested by the consumer device to be printed was successfully printed by the particular printer; and
    in response to receiving, by the server and from the printer controller that controls the particular printer, the indication that the particular printable object that was requested by the consumer device to be printed was successfully printed by the particular printer, incrementing, by the server, a count of the number of times that the particular printable object was indicated by the set of printers as having been successfully printed on behalf of the particular consumer.

9. The system of claim 8, wherein receiving, at the server and from the printable object designing device, the data defining the shape of the particular object comprises receiving a STereoLithography (STL) file that defines the shape of the particular printable object.

10. The system of claim 8, wherein receiving, at the server and from the printable object designing device, the digital rights comprises receiving digital rights defining that printing the particular printable object requires a threshold security level,
    wherein determining, by the server, whether the digital rights for the particular printable object permit the request to print the particular printable object by the particular printer to be fulfilled comprises determining, by the server, that a security level of the consumer using the consumer device satisfies the threshold security level.

11. The system of claim 8, wherein generating, from the data defining the shape of the particular printable object, printer instructions for printing the particular printable object comprises generating a G-Code file from the data defining the shape of the particular printable object.

12. The system of claim 8, the operations comprising receiving, at the server and from the printable object designing device, digital rights for viewing the particular printable object and providing, by the server to the consumer device, the digital rights for viewing the particular printable object.

13. A non-transitory computer-readable medium storing software comprising instructions executable by one or more computers which, upon such execution, cause the one or more computers to perform operations comprising:

receiving, by a system that includes (i) a server that is configured to instruct a particular printer to print a particular printable object on behalf of a particular consumer in response to a determination by the server that a number of times that the particular printable object was indicated by a set of printers as having been successfully printed on behalf of the particular consumer is less than a number of prints specified by digital rights for printing the particular printable object on behalf of the particular consumer, (ii) a printable object designing device, (iii) a consumer device, (iv) a set of printers, and (v) a set of printer controllers that each control a printer of the set of printers and each include logic that causes the printer controller to provide an indication to the server that the particular printable object was successfully printed on behalf of the particular consumer in response to a determination that the particular printable object has finished being printed by the printer, at the server and from the printable object designing device, data defining the shape of the particular printable object;

receiving, at the server and from the printable object designing device, the digital rights that specify the number of prints for the particular printable object on behalf of the particular consumer;

receiving, at the server from the consumer device, a request for printable objects that are stored by the server;

providing, by the server to the consumer device, information describing the printable objects that are stored by the server and viewable by the consumer using the consumer device;

receiving, at the server from the consumer device, a request for digital rights for printing the printable objects that are stored by the server and viewable by the consumer using the consumer device;

providing, by the server to the consumer device, a description of the digital rights for printing the printable objects that are stored by the server and viewable by the consumer using the consumer device;

receiving, at the server from the consumer device, a request to print a particular printable object of the printable objects by a particular printer of the set of printers;

determining, by the server, whether the number of times that the particular printable object was indicated by the set of printers as having been successfully printed on behalf of the particular consumer is less than the number of prints specified by the digital rights for printing the particular printable object on behalf of the particular consumer;

in response to determining that the number of times that the particular printable object was indicated by the set of printers as having been successfully printed on behalf of the particular consumer is less than the number of prints specified by the digital rights for printing the particular printable object on behalf of the particular consumer; generating, from the data defining the shape of the particular printable object, printer instructions for printing the particular printable object;

providing the printer instructions to the printer controller that controls the particular printer;

receiving, by the server and from the printer controller that controls the particular printer, an indication that the particular printable object that was requested by the consumer device to be printed was successfully printed by the particular printer; and in response to receiving, by the server and from the printer controller that controls the particular printer, the indication that the particular printable object that was requested by the consumer device to be printed was successfully printed by the particular printer, incrementing, by the server, a count of the number of times that the particular printable object was indicated by the set of printers as having been successfully printed on behalf of the particular consumer.

14. The method of claim 1, wherein receiving, at the server from the consumer device, a request for digital rights for printing the printable objects that are stored by the server and viewable by the consumer using the consumer device is in response to providing, by the server to the consumer device, information describing the printable objects that are stored by the server and viewable by the consumer using the consumer device.

15. The method of claim 1, wherein providing the printer instructions to the printer controller that controls the particular printer comprises:

encrypting the printer instructions using an encryption key; and providing the printer instructions in encrypted form to the printer controller, where a corresponding decryption key is provided by a device of a print personnel operating the particular printer.

\* \* \* \* \*